United States Patent
Iacob et al.

(10) Patent No.: US 10,626,277 B2
(45) Date of Patent: Apr. 21, 2020

(54) POWDER PAINT THERMOSETTING BINDER COMPOSITION AND MANUFACTURING METHOD

(71) Applicant: H.E.F., Andrezieux Boutheon (FR)

(72) Inventors: Constantin Iacob, St. Georges sur Fontaine (FR); Sébastien Bucher, Saint Etienne (FR); Christophe Heau, Saint-Etienne (FR); Fabrice Prost, Saint Etienne (FR)

(73) Assignee: H.E.F., Andrezieux Boutheon (FR)

( * ) Notice: Subject to any disclaimer, the term of this patent is extended or adjusted under 35 U.S.C. 154(b) by 0 days.

(21) Appl. No.: 15/737,739

(22) PCT Filed: Jun. 17, 2016

(86) PCT No.: PCT/FR2016/051486
§ 371 (c)(1),
(2) Date: Dec. 18, 2017

(87) PCT Pub. No.: WO2016/203177
PCT Pub. Date: Dec. 22, 2016

(65) Prior Publication Data
US 2018/0179396 A1    Jun. 28, 2018

(30) Foreign Application Priority Data

Jun. 17, 2015 (FR) ................................ 15 55554

(51) Int. Cl.
| | | |
|---|---|---|
| C09D 5/03 | (2006.01) | |
| C09D 163/00 | (2006.01) | |
| C09D 5/24 | (2006.01) | |
| H01B 1/22 | (2006.01) | |
| C08K 3/04 | (2006.01) | |
| C08K 9/02 | (2006.01) | |
| C08K 3/08 | (2006.01) | |
| C08K 3/22 | (2006.01) | |

(52) U.S. Cl.
CPC ............ *C09D 5/03* (2013.01); *C09D 5/24* (2013.01); *C09D 163/00* (2013.01); *H01B 1/22* (2013.01); *C08K 3/042* (2017.05); *C08K 9/02* (2013.01); *C08K 2003/0806* (2013.01); *C08K 2003/0812* (2013.01); *C08K 2003/2241* (2013.01); *C08K 2201/001* (2013.01)

(58) Field of Classification Search
None
See application file for complete search history.

(56) References Cited

U.S. PATENT DOCUMENTS

| | | | | |
|---|---|---|---|---|
| 4,066,613 A | * | 1/1978 | Peng ...................... | C09D 5/03 523/318 |
| 4,734,468 A | * | 3/1988 | Marx ................... | C08G 59/226 523/400 |
| 5,244,944 A | * | 9/1993 | Bott ...................... | C08G 59/42 523/461 |
| 5,728,779 A | * | 3/1998 | van de Werff ....... | C09D 163/00 525/113 |
| 6,093,774 A | * | 7/2000 | Dumain ................ | C09D 5/032 525/166 |
| 7,034,075 B1 | * | 4/2006 | Torborg ................ | C08J 3/203 525/170 |
| 2002/0102406 A1 | | 8/2002 | Muthiah | |
| 2003/0149233 A1 | | 8/2003 | Muthiah et al. | |

FOREIGN PATENT DOCUMENTS

| | | |
|---|---|---|
| EP | 0916709 A2 | 5/1999 |
| EP | 1050564 A2 | 11/2000 |
| RU | 2303616 C2 | 7/2007 |

OTHER PUBLICATIONS

International Search Report for PCT Patent App. No. PCT/FR2016/051486 (dated Sep. 2, 2016) with English language translation thereof.
Written Opinion for PCT Patent App. No. PCT/FR2016/051486 (dated Sep. 2, 2016).
May 24, 2019 Russian Search Report issued in International application No. PCT/FR2016/051486.

* cited by examiner

*Primary Examiner* — Katie L. Hammer
(74) *Attorney, Agent, or Firm* — Kenealy Vaidya LLP

(57) ABSTRACT

Some embodiments relate to a powder paint thermosetting binder composition that is solvent-free and includes at least one hardener and one cross-linking catalyst, and a first epoxy resin or a functionalized resin having at least one epoxy group. The resin has an epoxy equivalent weight of between 250 and 800 g/eq and a glass transition temperature of between 35 and 80° C. A binder composition of this kind has a polymerization starting temperature of 80° C. and a gel time of between 35 s and 140 s at 180° C. Some embodiments also relate to a paint composition containing a thermosetting binder composition of this kind, at least one pigment and, optionally, in addition a leveling agent and inorganic or organic fillers.

13 Claims, No Drawings

POWDER PAINT THERMOSETTING BINDER COMPOSITION AND MANUFACTURING METHOD

CROSS REFERENCE TO RELATED APPLICATION(S)

This application is a national phase filing under 35 C.F.R. § 371 of and claims priority to PCT Patent Application No. PCT/FR2016/051486, filed on Jun. 17, 2016, which claims the priority benefit under 35 U.S.C. § 119 of French Patent Application No. 1555554, filed on Jun. 17, 2015, the contents of each of which are hereby incorporated in their entireties by reference.

BACKGROUND

Some embodiments are related to a powder paint thermosetting binder composition, and also to the use thereof in a paint composition.

In certain fields, such as the aeronautical industry, it may be necessary to use paints which have a low polymerization temperature (in particular of at most 120° C.) Paint compositions having a low polymerization temperature are known to those skilled in the art.

Thus, European patent application EP1050565 teaches a powder thermosetting coating composition including an epoxy resin of bisphenol A type, the glass transition temperature of which is 55° C. and which has an epoxy equivalent of between 650 and 725 g/eq.

Moreover, American patent application US 2003/149233 describes a powder coating composition which can polymerize at temperatures between 107° C. and 149° C. (between 225° F. and 300° F.). This coating composition includes an epoxy resin which has an epoxy equivalent of between 100 and 700 and a glass transition temperature of between 35° C. and 55° C.

SUMMARY

On the other hand, nothing is mentioned, in these patent applications, regarding the gel time at 180° C. (or gelling time) of these coating compositions when they go from the molten state to the solid state, nor, a fortiori, regarding the fact that this gel time is short, without however being excessively short.

For the purposes of some embodiments, the term "gel time" is intended to mean the time taken for a volume of coating powder to become undeformable, under given conditions, after it has melted. The gel time is measured according to the method of characterization of coating powders according to the ISO 8130-6: 1992 standard.

In point of fact, the shorter the gel time of a composition, the more reactive the composition will be and the shorter the time that may be required for its polymerization.

However, an excessively fast polymerization will induce the presence of a considerable number of defects in the coating, whereas too long a gel time will indicate that the composition is not sufficiently reactive to envision low-temperature polymerization. Furthermore, an excessively long gel time risks inducing prolonged contact of the constituent elements of the composition according to some embodiments with the substrate to which it is applied, these elements being capable of chemically modifying the constituent materials of the substrate (for example, a substrate made of composite material).

In order to address or solve the abovementioned drawbacks, the applicant has developed a powder paint binder composition which is solvent-free and which has a low polymerization temperature and quite a short gel time at 180° C., between 35 s and 140 s. A low polymerization starting temperature and a gel time between 35 s and 140 s at 180° C. make it possible to ensure the integrity of the substrate.

For the purposes of some embodiments, the term "polymerization temperature" is intended to mean the temperature at which the degree of polymerization is 80% (or in other words, the temperature at which the polymerization reaction is 80% complete).

More particularly, some embodiments are directed to a solvent-free powder paint thermosetting binder composition, which includes:
  at least one first epoxy resin or one resin functionalized with at least one epoxy group, the resin having an epoxy equivalent of between 250 and 800 g/eq and a glass transition temperature of between 35 and 80° C.,
  at least one curing agent, and
  optionally, a crosslinking catalyst,
  wherein the composition has a polymerization starting temperature of 80° C. and a gel time of between 35 s and 140 s at 180° C.

For the purposes of some embodiments, the term "epoxy equivalent" is intended to mean the amount of resin, expressed in grams, which contains one mol of epoxy group (standard ISO 3001: 1999 (FR)).

According to a first embodiment of the binder composition, the composition can advantageously have the following characteristics:
  the first resin is a GMA acrylic resin, functionalized with at least one epoxy group, chosen from the group of resins and having an epoxy equivalent of between 250 and 700 g/eq, a glass transition temperature of between 35 and 50° C., and a dynamic melt viscosity of between 7 and 30 Pa·s at 150° C.,
  the curing agent is chosen from the group including or consisting of polycarboxylic acids and acid anhydrides, and
  the crosslinking catalyst is chosen from the group of tin-based organometallic compounds and quaternary ammonium salts,
  the binder composition having a polymerization temperature of about 120° C.

This first variant of binder composition according to some embodiments has a low polymerization temperature, and also good UV-resistance. The composition according to some embodiments makes it possible to satisfy the specifications of paints for the aeronautical industry for example, in particular in terms of UV-resistance and polymerization temperature (less than or equal to 120° C.), contrary to the currently known powder paint compositions. Indeed, the latter are limited to hydroxylated or carboxylated and acrylic polyester chemistries, which at the current time do not make it possible to envision crosslinking temperatures of less than or equal to 120° C. under standard conditions.

Advantageously, the molar ratio of the epoxy equivalent of the first resin to that of the curing agent can be between 0.7 and 1.2, and is possibly or preferably approximately 0.8.

According to a second embodiment of the binder composition, the composition can advantageously have the following characteristics:

the first resin is a bisphenol A diglycidyl ether (usually denoted by the acronym BADGE) epoxy resin having a dynamic melt viscosity of between 500 and 3000 mPa·s at 150° C., the curing agent is chosen from the group including or consisting of dicyandiamides, acid anhydrides, phenolic compounds and polyesters, and the crosslinking catalyst is chosen from the group of imidazoles, and the binder composition having a polymerization temperature of about 100° C.

This second variant of binder composition according to some embodiments also has a low polymerization temperature, and also excellent mechanical properties and chemical resistance properties.

This second variant of binder composition according to some embodiments can serve as a basis for a "functional" technical paint, and constitutes a formulation of choice for numerous fields of application, for instance those requiring stresses in terms of corrosion resistance, chemical resistance to organic solvents, mechanical resistance to abrasion, hardness, temperature resistance, dielectric rigidity. However, this second variant is not suitable for applications requiring UV resistance.

Advantageously, the binder composition according to the second implementation variant of some embodiments can advantageously also include a cresol novolac epoxy resin, which can possibly or preferably represent from 10% to 50% of the weight of the first resin in the binder composition.

The presence of such a resin in the binder composition according to some embodiments makes it possible to significantly improve the chemical-resistance and mechanical-resistance properties (in particular the abrasion resistance) of the paint films obtained from the powder paint binder composition according to some embodiments.

Some embodiments are directed to a paint composition including a thermosetting binder composition as defined according to some embodiments and at least one pigment, and optionally also a leveling agent and inorganic or organic fillers.

Among the organic fillers that can be used in the paint composition according to some embodiments, mention may in particular be made of polyolefin waxes, micronized benzoin, and mixtures thereof.

Among the inorganic fillers that can be used in the paint composition according to some embodiments, mention may in particular be made of certain specific refractory fillers. The presence of such fillers in the paint composition according to some embodiments makes it possible to obtain paints having dielectric properties.

To this effect, by way of fillers that are particularly effective for conferring dielectric properties, mention may in particular be made of refractory fillers belonging to the hydrated alumina family, for instance the fillers sold under the registered trademark Micral® 932 by the company Huber. When incorporated into the formulation at weight percentages of between 10% and 40% of the total weight of the composition, these fillers make it possible to clearly increase the resistivity of the paint.

The paint composition according to some embodiments can likewise also include at least one electrically conductive filler, which is made of a material that can be chosen from all or most of the electrically conductive materials, such as metals, metalloids, etc. The presence of such an electrically conductive filler in the paint composition makes it possible to render it electrically conductive.

Advantageously, the electrically conductive filler can be in the form of support particles coated with a layer of a metal chosen from copper, nickel, cobalt and silver.

The addition of the conductive filler to the paint composition according to some embodiments can be carried out at the time of the initial mixing of the raw materials that may be required for the production of the paint composition, or as post-addition (on leaving the micronizer).

The support particles of the electrically conductive filler are in particular multimaterial powders of various compositions, morphologies and particle sizes, and which can advantageously be chosen from:

expanded graphite, diamond or carbon particles or carbon nanotubes, plant particles in the form of (short or long) fibers, which will possibly or preferably be chosen from flax, hemp, coconut, kenaf and *miscanthus* fibers, and polymer fillers.

Possibly or preferably, lamellar particles of graphite that are coated with a layer of silver will be used as coated support particles, the layer of silver representing by weight at most 15% of the total weight of the paint composition.

The coating of the support particles (or grains) with silver can in particular be carried out by immersing the powder in an autocatalytic chemical bath. Silver is a candidate of choice because of its very low resistivity and high oxidation resistance. However, all or most conductive materials can be envisioned, in particular Cu, Ni, Co.

The coated graphite particles can be in any granulometric and morphological form, but, in the context of some embodiments, lamellar graphite particles will possibly or preferably be used.

The support particles coated with the conductive filler can advantageously represent from 20% to 40% by weight of the total weight of the composition, for support particles of any type, and approximately 30% if the support particles are graphite particles. The fibrous morphology can advantageously be used for obtaining percolation for low levels of incorporation of particles.

By way of example, the addition of a graphite powder (with an average particle size of between 5 and 75 μm) of lamellar morphology and coated with silver, in a paint composition according to some embodiments in an amount of 30% by weight relative to the weight of the composition, makes it possible to obtain a paint film having an electrical resistivity of less than or equal to 1 Ω·cm.

The advantage of the use of the coated fillers is the decrease in the weight of the conductive materials for achieving percolation, the surface distribution over a controlled thickness, and the obtaining of multiple properties such as electrical and thermal conductivity.

Some embodiments are illustrated in greater detail in the following examples.

In these examples, unless otherwise indicated, all or most of the percentages and parts are expressed as weight percentages.

EXAMPLES

Products
  Resins:
    epoxy-functionalized GMA acrylic resin (epoxy equivalent: 290-340 g/eq);
    BADGE epoxy resin (epoxy equivalent: 500-550 g/eq);
    BADGE epoxy resin (epoxy equivalent: 580-650 g/eq);
    BADGE epoxy resin (epoxy equivalent: 710-760 g/eq);

cresol novolac epoxy resin (epoxy equivalent: 200-230 g/eq);

Curing Agents:
aliphatic polyanhydride curing agent (acid number 300-330 mgKOH/g);
phenolic curing agent (weight of hydroxyl equivalent: 220-270 g/eq);
polyester resin (acid number: 65-90 mgKOH/g);
polyhydroxyl o-cresol novolac resin (weight of hydroxyl equivalent: 110-130 g/eq);
acid anhydride curing agent (acid number: 500-550 mgKOH/g);

Organic Additives (for Facilitating Degassing):
micronized benzoin (with particles having a diameter <50 µm);
polyolefin wax;

Crosslinking Catalysts:
2-methylimidazole;
quaternary ammonium salt;

Leveling Agents
resin sold under the tradename PV88 by the company Estron Chemical;

Pigments:
$TiO_2$.

Example 1

Formulation of a Binder Composition According to Some Embodiments Based on GMA Acrylic Chemistry A binder composition according to some embodiments based on a GMA acrylic resin, the various constituents of which with their respective amounts are indicated in table 1 below as weight percentages relative to the total weight of the composition, is prepared:

TABLE 1

| Constituents | Weight percentages |
| --- | --- |
| GMA acrylic resin (epoxy equivalent: 290-340 g/eq) | 55-60 |
| Aliphatic polyanhydride (acid number 300-330 mgKOH/g) | 25-30 |
| Quaternary ammonium salt | 0.3-0.5 |
| Micronized benzoin | 1.5 |
| PV88 | 1.2 |
| Polyolefin wax | 4 |
| $TiO_2$ | 8.4 |

In this example, the molar ratio of epoxy equivalent between the resin and the curing agent is approximately 0.8. This stoichiometric ratio can of course be modified (possibly or preferably between 0.7 and 1.2) according to the desired characteristics.

This composition is particularly suitable for applications at low temperature since it has a low polymerization temperature (of 100° C., temperature at which 80% of the composition is crosslinked). The gel time measured at 180° C. is between 110 and 120 s.

Moreover, this composition exhibits very good UV-resistance. Its UV-resistance is greater than 1000 hours in a QUV aging chamber under $UV_A$ irradiation with an irradiance of 0.77 W/m² and a temperature of 55° C.

This composition is also particularly suitable for painting thermosensitive composite substrates which have a strong degassing nature, because of the presence of a polyolefin wax which significantly prolongs the gel time of the composition.

Example 2 According to Some Embodiments

Formulation of a Binder Composition According to Some Embodiments Based on BADGE Epoxy Chemistry A first binder composition according to some embodiments based on an epoxy resin, the various constituents of which with their respective amounts are indicated in table 2 below as weight percentages, is prepared:

TABLE 2

| Constituents | Weight percentages |
| --- | --- |
| BADGE epoxy resin (epoxy equivalent: 500-550 g/eq) | 62-67 |
| Phenolic curing agent (weight of hydroxyl equivalent: 220-270 g/eq) | 13-18 |
| Benzoin | 0.29 |
| PV88 | 0.87 |
| $TiO_2$ | 19.31 |

This composition is particularly suitable for applications at low temperature since it has a low polymerization temperature of about 100° C. The gel time measured at 180° C. is between 40 and 50 s. Moreover, this composition exhibits excellent mechanical properties and chemical resistance properties of the paint films obtained from this composition.

It in particular makes it possible to satisfy the specifications of the aeronautical industry in terms of resistance to fuels (1000 hours at ambient temperature), resistance to mineral and synthetic oils (250 hours at 70° C.) and resistance to degreasing agents. The resistance to degreasing agents is evaluated by passing over the paint a cloth soaked in degreasing agent (MEC, diestone, etc.). After 30 passes (back and forwards over the surface with the soaked cloth), no change in color or in gloss is observed on the paint, nor any modification of the appearance of the paint layer.

The characteristics of mechanical resistance and flexibility (folding on an 8 mm mandrel, mass fall of 1 kg/25 cm), and of scratch resistance are in accordance with the specifications of the aeronautical industry (no cracking or detachment is observed on the paint).

Example 3 According to Some Embodiments

Formulation of a Binder Composition According to Some Embodiments Based on BADGE Epoxy Chemistry A second binder composition according to some embodiments based on an epoxy resin, the various constituents of which with their respective amounts are indicated in table 3 below as weight percentages, is prepared:

TABLE 3

| Constituents | Weight percentages |
| --- | --- |
| BADGE epoxy resin (epoxy equivalent: 580-650 g/eq) | 32-37 |
| Polyester resin (acid number: 65-90 mgKOH/g) | 42-47 |
| Benzoin | 0.3% |
| PV88 | 0.88% |
| $TiO_2$ | 19.68% |

This composition is particularly suitable for applications at low temperature since it has a low polymerization temperature of about 110° C. The gel time measured at 180° C. is between 50 and 60 s. Moreover, this composition exhibits excellent mechanical properties and chemical resistance properties of the paint films obtained from this composition, of the same order as in the previous example.

This formulation can also be used in rapid polymerization over the course of 1 minute at 160° C.

Example 4 According to Some Embodiments

Formulation of a Binder Composition According to Some Embodiments Based on BADGE Epoxy Chemistry A second binder composition according to some embodiments based on an epoxy resin, the various constituents of which with their respective amounts are indicated in table 4 below as weight percentages, is prepared:

TABLE 4

| Constituents | Weight percentages |
|---|---|
| BADGE epoxy resin (epoxy equivalent: 710-760 g/eq) | 70-75 |
| o-cresol novolac resin (weight of hydroxyl equivalent: 110-130 g/eq) | 7-12 |
| 2-Methylimidazole | 0.15-0.35 |
| Benzoin | 0.41 |
| PV88 | 0.97 |
| $TiO_2$ | 16.26 |

This composition is particularly suitable for applications at low temperature since it has a low polymerization temperature of about 110° C. The gel time measured at 180° C. is between 35 and 70 s. Moreover, this composition exhibits excellent mechanical properties and chemical resistance properties of the paint films obtained from this composition. Its properties are comparable to those in the previous examples.

Example 5 According to Some Embodiments

Formulation of a Binder Composition According to Some Embodiments Based on BADGE Epoxy Chemistry and the Presence of a Cresol Novolac Epoxy Resin A fifth binder composition according to some embodiments based on an epoxy resin, the various constituents of which with their respective amounts are indicated in table 5 below as weight percentages, is prepared:

TABLE 5

| Constituents | Weight percentages |
|---|---|
| BADGE epoxy resin (epoxy equivalent: 710-760 g/eq) | 50-60 |
| Cresol novolac epoxy resin (epoxy equivalent: 200-230 g/eq) | 10-20 |
| Acid anhydride curing agent (acid number: 500-550 mgKOH/g) | 15-25 |
| Benzoin | 0.3 |
| PV88 | 1.19 |
| $TiO_2$ | 9.9 |

This composition exhibits excellent mechanical properties (abrasion resistance) and chemical resistance properties of the paint films obtained from this composition, by virtue of the presence of the cresol novolac epoxy resin. In particular, it is a composition developed for providing exceptional chemical resistance to certain particularly aggressive hydraulic fluids used in the aeronautical field. This composition is 80% crosslinked at a temperature of 140° C. The gel time measured at 180° C. is between 70 and 80 s.

Comparative Example

Formulation of a Binder Composition Based on BADGE Epoxy Chemistry

A binder composition based on an epoxy resin, the various constituents of which with their respective amounts are indicated in table 6 below as weight percentages, is prepared:

TABLE 6

| Constituents | Weight percentages |
|---|---|
| BADGE epoxy resin (epoxy equivalent: 710-760 g/eq) | 38-42 |
| Polyester resin (acid number: 70-90 mgKOH/g) | 38-42 |
| Benzoin | 0.3 |
| PV88 | 0.88 |
| $TiO_2$ | 19.68 |

The gel time of this composition, measured at 180° C., is between 250 and 260 s.

The use of this formulation at temperatures below 140° C. does not make it possible to obtain a degree of crosslinking greater than 80%. The mechanical characteristics of the paint films thus produced are insufficient, making this composition unsuitable for low polymerization temperatures.

The invention claimed is:

1. A solvent-free powder paint thermosetting binder composition, comprising:
   at least one GMA acrylic resin functionalized with at least one epoxy group chosen from the group consisting of resins having an epoxy equivalent of between 250 and 700 g/eq, a glass transition temperature of between 35 and 50° C., and a dynamic melt viscosity of between 7 and 30 Pa·s at 150° C.;
   at least one curing agent chosen from the group consisting of polycarboxylic acids and acid anhydrides; and
   a crosslinking catalyst chosen from the group consisting of tin-based organometallic compounds and quaternary ammonium salts; and
   wherein the binder composition has a polymerization starting temperature of 120° C. and a gel time of between 35 s and 140 s at 180° C.

2. The binder composition as claimed in claim 1, wherein the molar ratio of the epoxy equivalent of the first resin to that of the curing agent is between 0.7 and 1.2, and is approximately 0.8.

3. A paint composition, comprising:
   the binder composition as defined in claim 1;
   at least one pigment; and
   a leveling agent and inorganic or organic fillers.

4. The paint composition as claimed in claim 3, further comprising at least one electrically conductive filler.

5. The paint composition as claimed in claim 4, wherein the electrically conductive filler is in the form of support particles coated with a layer of a metal chosen from copper, nickel, cobalt and silver.

6. The paint composition as claimed in claim 5, wherein the support particles of the electrically conductive filler are chosen from:
   expanded graphite, diamond or carbon particles or carbon nanotubes;
   plant particles in the form of fibers; and
   polymer fillers.

7. The paint composition as claimed in claim 6, wherein the coated support particles are lamellar graphite particles coated with a layer of silver, the layer of silver representing by weight at least 15% of the total weight of the paint composition.

8. The paint composition as claimed in claim 3, further comprising a refractory filler, which is chosen from hydrated aluminas and represents between 10% and 40% by weight of the total weight of the composition.

9. The paint composition as claimed in claim 4, further comprising a refractory filler, which is chosen from hydrated aluminas and represents between 10% and 40% by weight of the total weight of the composition.

10. The paint composition as claimed in claim 5, further comprising a refractory filler, which is chosen from hydrated aluminas and represents between 10% and 40% by weight of the total weight of the composition.

11. The paint composition as claimed in claim 6, further comprising a refractory filler, which is chosen from hydrated aluminas and represents between 10% and 40% by weight of the total weight of the composition.

12. The paint composition as claimed in claim 7, further comprising a refractory filler, which is chosen from hydrated aluminas and represents between 10% and 40% by weight of the total weight of the composition.

13. The paint composition as claimed in claim 6, wherein the plant particles in the form of fibers are chosen from the group consisting of flax, hemp, coconut, kenaf, and *miscanthus* fibers.

\* \* \* \* \*